April 29, 1924.
S. EINSTEIN
1,492,545
CONE DRIVE MILLER HAVING BOX TYPE OVER-ARM
Filed July 22, 1921   4 Sheets-Sheet 3
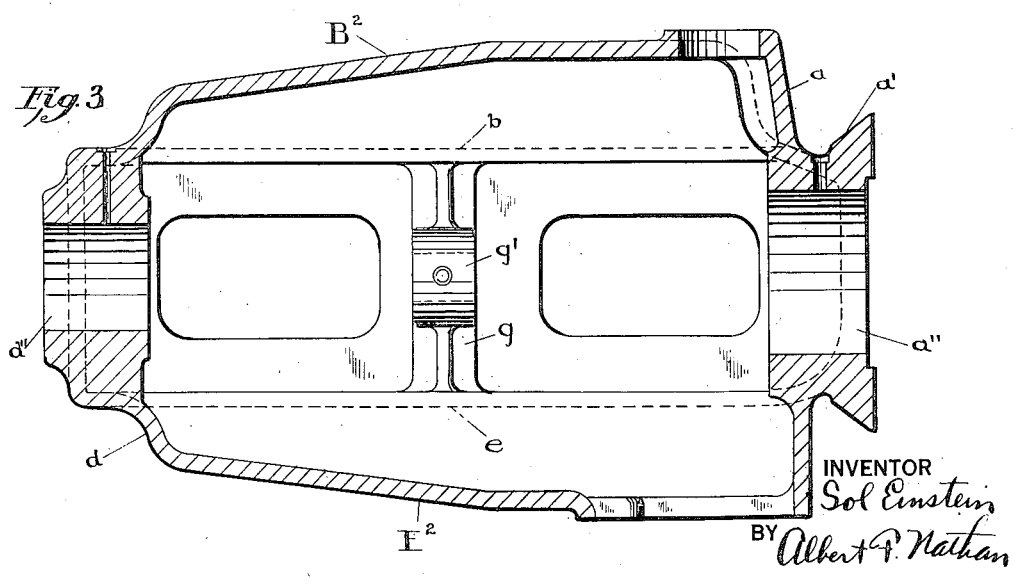
INVENTOR
Sol Einstein
BY Albert P. Nathan
ATTORNEY

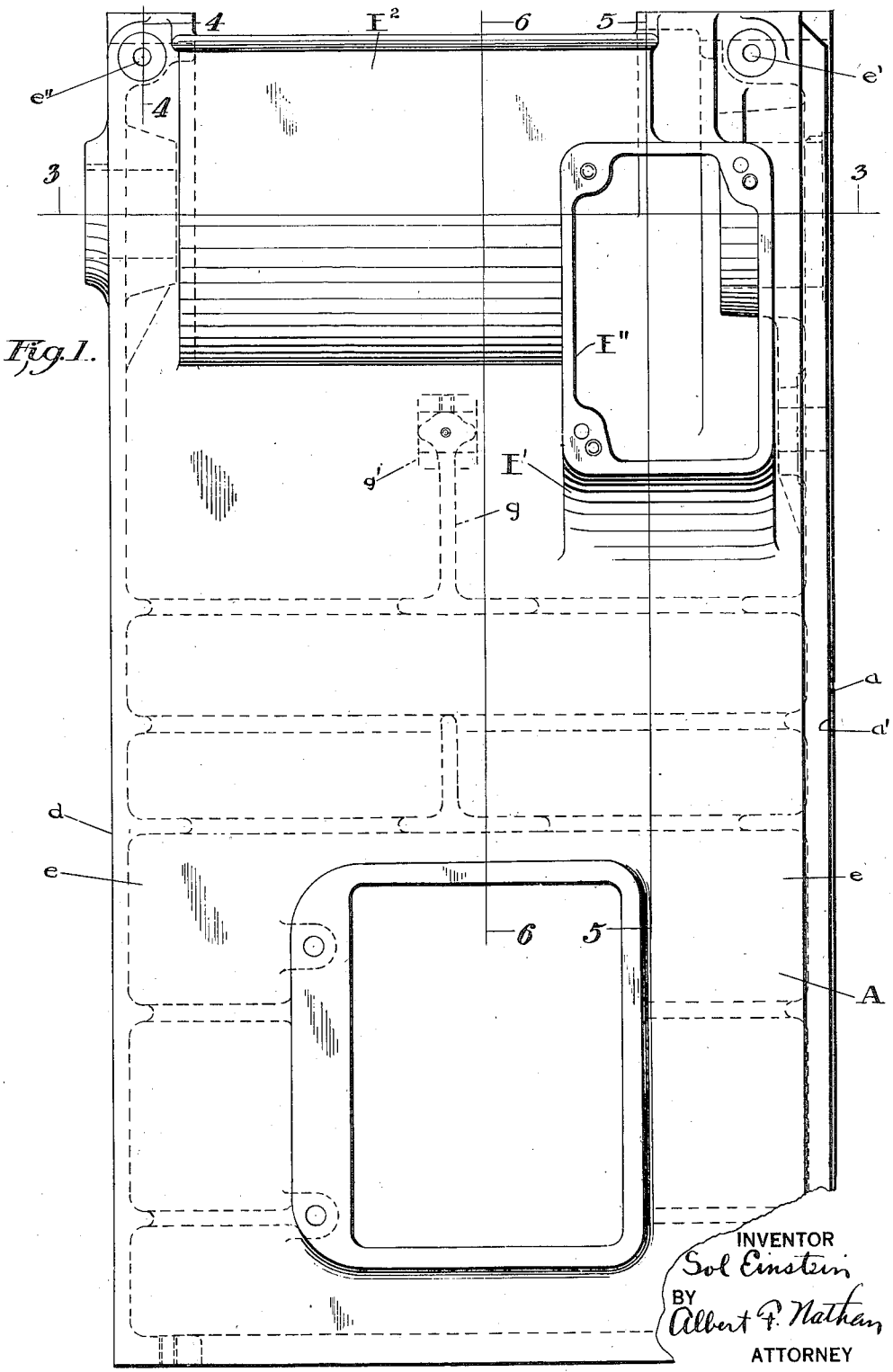

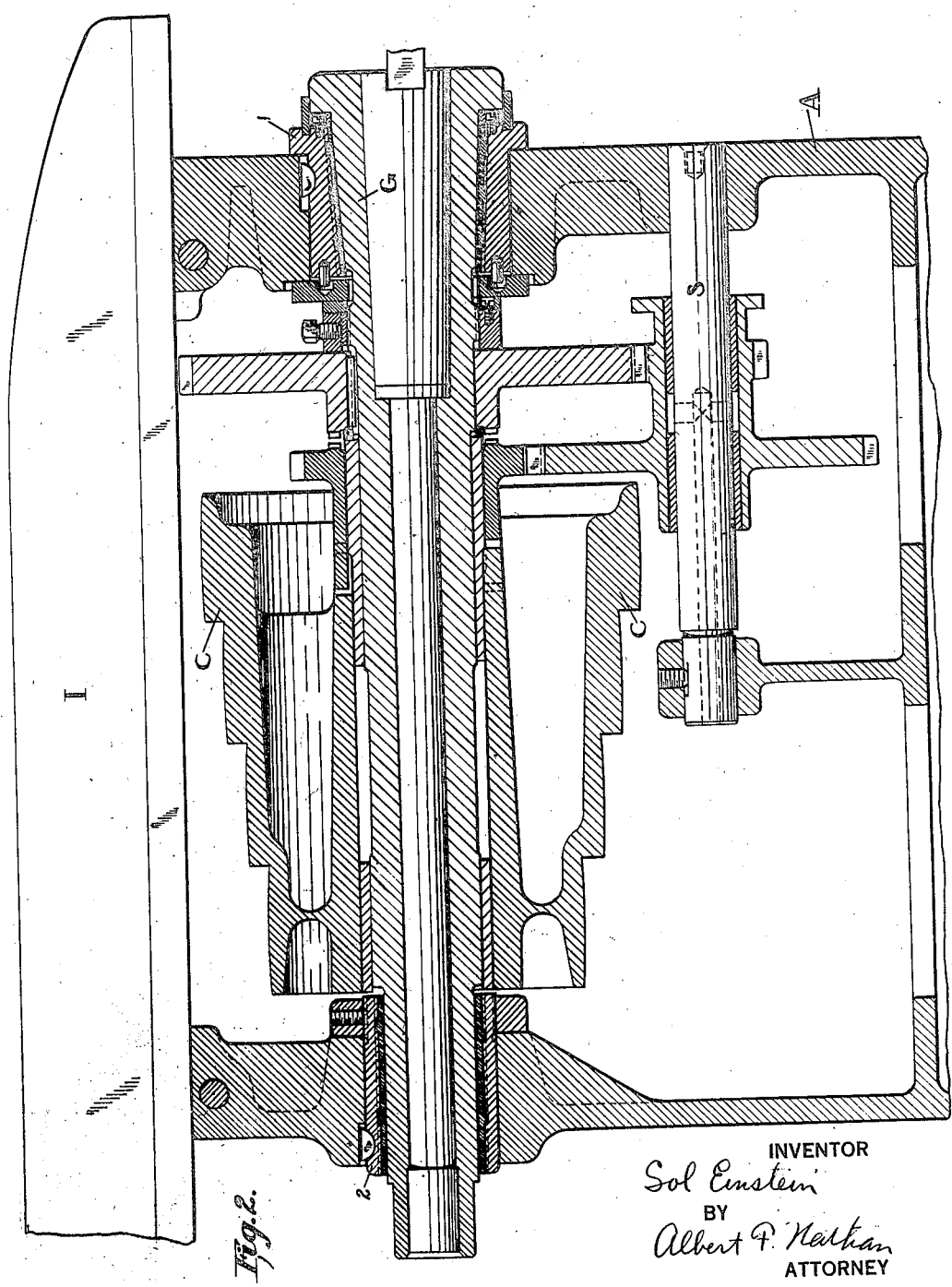

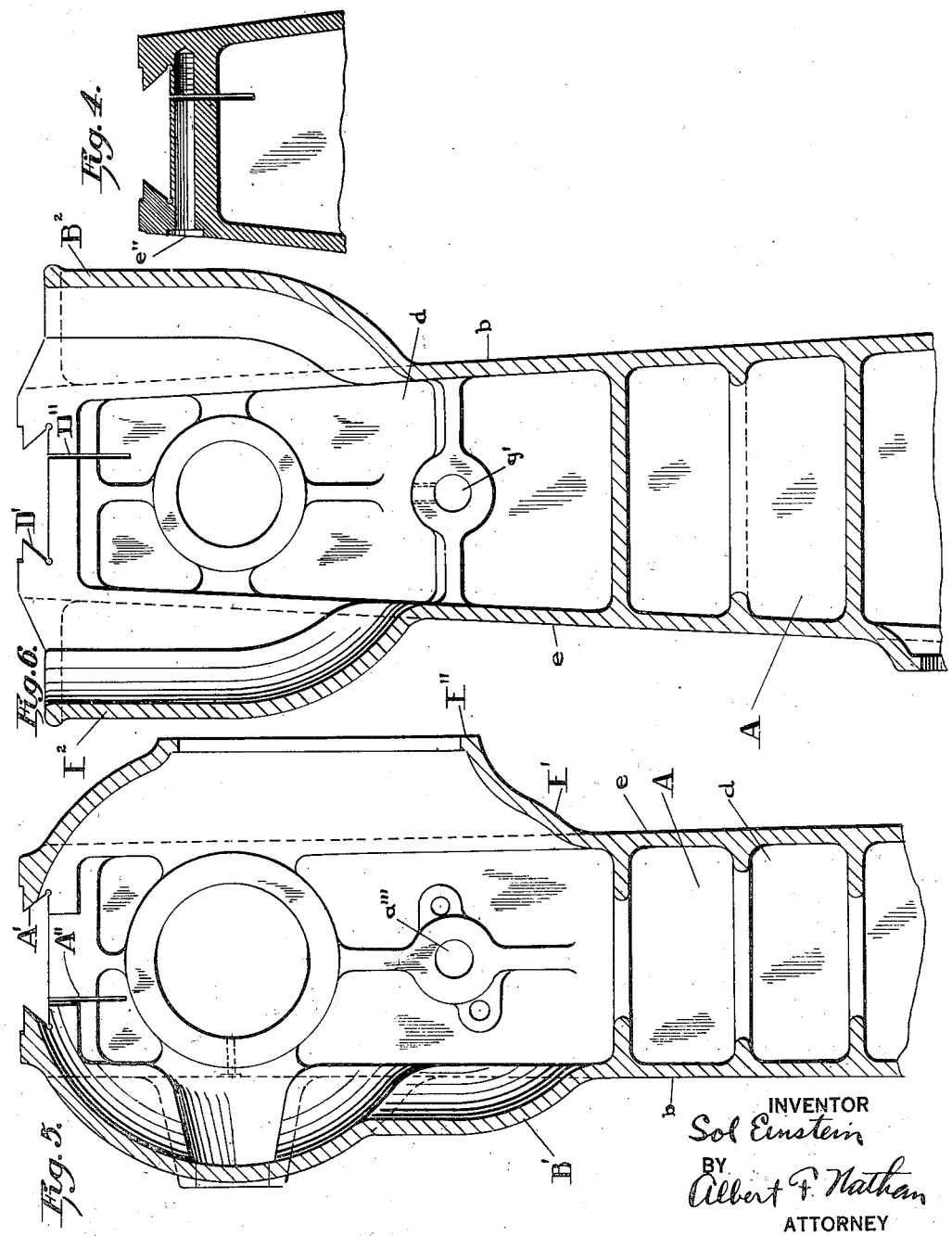

Patented Apr. 29, 1924.

1,492,545

UNITED STATES PATENT OFFICE.

SOL EINSTEIN, OF CINCINNATI, OHIO, ASSIGNOR TO THE CINCINNATI MILLING MACHINE COMPANY, OF CINCINNATI, OHIO, A CORPORATION OF OHIO.

CONE-DRIVE MILLER HAVING BOX-TYPE OVER-ARM.

Application filed July 22, 1921. Serial No. 486,691.

*To all whom it may concern:*

Be it known that I, SOL EINSTEIN, a citizen of the United States, and residing at Cincinnati, in the county of Hamilton and State of Ohio, have invented a new and Improved Cone-Drive Miller Having Box-Type Over-Arm, of which the following specification is a full disclosure.

This invention relates to belt-driven machine-tools and it proposes a novel co-ordination of the several fixed and working elements, with the object of attaining greater compactness in the arrangement, fewer and more rugged parts, and a material reduction in the cost of manufacture.

In certain species of milling-machines, it is usual to arrange certain gears and transmission elements within a hollow column of the so-called "box-type" and to surmount the column with an "over-arm" which protrudes beyond one side and supports the "out-bearing" for the outer end of the spindle that carries the milling-cutter. The spindle derives its motion (through suitable transmission gears) from a pulley which is habitually located at one side of the column to provide for a free and unobstructed travel of the belt which depends from an overlying countershaft. Frequently, this pulley is formed of a series of steps and is known as a "cone-pulley"; the object being to enable a few graduated speeds to be had by a mere shifting of the belt, thereby reducing the number of change gears otherwise requisite for the corresponding series of speeds.

The aforesaid conventional arrangement is more or less awkward and it involves certain structural complications; all of which this invention aims to eliminate.

Other objects and advantages will be in part indicated in the following description and in part rendered apparent therefrom in connection with the annexed drawings.

To enable others skilled in the art to understand the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Fig. 1 is a left-hand side-elevation of the column of a milling machine constructed in accordance with this invention. Fig. 2 is a longitudinal section through the axis of the spindle showing the stepped driving pulley, the change-gears, and the over-arm. Fig. 3 is a horizontal section through the line 3—3 of Fig. 1. Fig. 4 is a section through the line 4—4 of Fig. 1. Fig. 5 is a vertical section of the upper part of the column taken along the line 5—5 of Fig. 1, and Fig. 6 is a vertical section along the line 6—6 of Fig. 1.

The drawings show this invention incorporated in a milling-machine which comprises a suitable base (not shown) on which is mounted a column of the "box-type"; these major frame-elements providing for the mounting of certain working elements such as a knee, a saddle, a table, trip-mechanism for controlling the feeds of said elements, pumps for the lubricant and the coolant and the like; all of which being conventional have not been illustrated.

The column is constructed hollow in form and resembles an elongated box which is open at its upper end for the reception of a dependent belt which rides around a stepped-pulley directly underlying the over-arm as will be presently described in detail. The column, represented by A, has its front end-wall *a* formed to provide an upright slideway *a'* whereby the saddle may be guided and clamped in its various positions. Adjacent its upper end, this end-wall *a* is also provided with an opening *a''* which registers with an opening *d''* in the rear end-wall *d*; these openings being for the reception of journals for positioning the spindle.

The front and rear end-walls are, at their uppermost extremities, provided with V-shaped slideways A' and D' respectively and also with saw-cuts A'' and D'' for the purpose of providing a slight degree of spring in the metal whereby the over-arm may be clamped in place within the slideway aforesaid by means of clamping bolts within the threaded sockets *e'* and *e''*. Interiorly within the column is a transverse web *g* extending between the side-walls *e* and *b*. The boss *g'* provides an opening for receiving the journal of a shaft on which the back gear unit is slidably mounted and, to accommodate the back gears, the side-walls of the column are locally bulged outwardly as indicated by B' and E'.

The stepped-pulley C is arranged co-axially with the spindle G and is located intermediate the ends of the spindle; instead of being arranged on the outside of the column, as has heretofore been the custom. This is made possible by reason of the unique formation of the upper end of the column in which the intermediate portions on the side-walls $e$ and $b$ are flared outwardly funnel-like, as indicated by $B^2$ and $E^2$. The parts of these flared wall-portions extending above the axis of the spindle are given a substantially vertical direction but, as indicated by Fig. 3, these portions $B^2$ and $E^2$ may converge rearwardly in proportion to the decrease in diameters of the successive steps of the pulley. Their upper edges extend to the end-walls of the column; thereby forming an open basin, so to speak, within which are located the stepped-pulley and the spindle-driving gears; the walls of this basin serving the double purpose of bracing and reinforcing the end-walls of the column and providing belt-guards protecting the user from any injury occasioned by coming in contact with the fast-running belt. The over-arm I extends bridge-like across the open upper end of the column, as shown best by Fig. 2, and is amply supported on the V-shaped seats mounted by the respective end-walls of the column; said over-arm being adjustable longitudinally to accommodate various lengths of arbors affixed to the end of the spindle and supported at their outer ends by said over-arm. It will be seen that the belt, in passing around the different steps of the pulley, straddles the over-arm; there being ample clearance between the belt and the over-arm, on the one hand, and the belt and the flaring side-walls $E^2$ and $B^2$, on the other hand.

The aforesaid arrangement makes for great compactness, rigidity and simplicity in construction. It enables a one-piece casting to take the place of various guards and castings heretofore secured together in previous constructions.

Without further analysis, the foregoing will so fully reveal the gist of this invention that others can, by applying current knowledge, readily adapt it for various utilizations by retaining one or more of the essential characteristics of either the generic or specific aspects of this invention, and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A milling-machine combining a box-type column having an open upper end; an over-arm mounted bridge-like at the upper extremity of said column; and a pulley located between the walls of said column and underlying said bridge-like over-arm; said pulley and over-arm being so proportioned that the driving belt will freely straddle said over-arm.

2. A milling-machine combining a box-type column; an over-arm extending horizontally across its upper extremity; and a pulley symmetrically underlying said over-arm, the side-walls of said column being located and arranged to form guards for a belt depending clear of each side of said over-arm and passing around said pulley.

3. A machine-tool combining a box-type column having an open upper end and a bridge-piece extending across said upper end clear of the side-walls of said column and supported at its ends by the opposite vertical end-walls of said column; and a pulley located within said column immediately beneath said bridge-piece, whereby a depending belt may pass around said pulley without contacting with said bridge-piece.

4. A machine-tool combining a box-type column having a bridge extending horizontally across its upper open end and integrally connected at its ends with the opposing end-walls of said column; a pulley within said column underlying said bridge, the side-walls of said column being deflected adjacent said pulley and arranged to clear said bridge to provide run-ways for a depending belt passing around said pulley.

5. A machine-tool combining a column; a member transversely mounted to extend bridge-like across its upper extremity; and a pulley immediately underlying said member, said column providing walls encasing said pulley and forming guards for a depending belt straddling said member and passing around said pulley.

In witness whereof, I hereunto subscribe my name, as attested by the subscribing witness.

SOL EINSTEIN.

Witness:
ALBERT F. NATHAN.